US010063613B2

(12) United States Patent
Houle et al.

(10) Patent No.: US 10,063,613 B2
(45) Date of Patent: Aug. 28, 2018

(54) SYSTEMS AND METHODS FOR UTILIZING CLIENT-SIDE SYNCHRONIZATION OF VIDEO AND OVERLAY

(71) Applicant: GENVID TECHNOLOGIES, INC., New York, NY (US)

(72) Inventors: Jocelyn Houle, Mont-St-Hilaire (CA); Fabien Ninoles, Montréal (CA)

(73) Assignee: Genvid Technologies, Inc., New York, NY (US)

(*) Notice: Subject to any disclaimer, the term of this patent is extended or adjusted under 35 U.S.C. 154(b) by 128 days.

(21) Appl. No.: 15/352,433

(22) Filed: Nov. 15, 2016

(65) Prior Publication Data
US 2018/0139260 A1 May 17, 2018

(51) Int. Cl.
*H04N 5/08* (2006.01)
*H04L 29/06* (2006.01)

(52) U.S. Cl.
CPC ........ *H04L 65/604* (2013.01); *H04L 65/4069* (2013.01)

(58) Field of Classification Search
CPC .......... H04N 5/08; H04N 14/467; H04N 9/87; G06T 1/0085; G06T 11/00; G06T 11/60; G06T 19/20; G06T 19/006; G06F 3/0488; G06F 3/04842
See application file for complete search history.

(56) References Cited

U.S. PATENT DOCUMENTS

| 6,072,503 | A | 6/2000 | Tani et al. |
| 6,791,579 | B2 | 9/2004 | Markel |
| 7,446,722 | B2 | 11/2008 | Sohfuku |
| 9,266,017 | B1 | 2/2016 | Parker et al. |
| 2005/0210512 | A1 | 9/2005 | Anderson et al. |
| 2014/0366057 | A1 | 12/2014 | Brockmann et al. |
| 2015/0071601 | A1* | 3/2015 | Dabous ................. G06Q 30/02 386/230 |
| 2016/0030841 | A1 | 2/2016 | Perlman et al. |
| 2016/0057317 | A1* | 2/2016 | Zhao .................. H04N 21/4627 348/515 |
| 2018/0061130 | A1* | 3/2018 | Wojdala ............... G06T 19/006 |

OTHER PUBLICATIONS

U.S. Appl. No. 15/352,421, filed Nov. 15, 2016, Ninoles et al.
U.S. Appl. No. 15/352,441, filed Nov. 15, 2016, Ninoles et al.

* cited by examiner

Primary Examiner — Kim T Nguyen
(74) Attorney, Agent, or Firm — Foley & Lardner LLP

(57) ABSTRACT

The present disclosure provides systems and methods for synchronizing data streams. A client computing device can receive a video stream including image data representing at least one video frame. The image data can include a first timecode encoded within the image data. The client computing device can receive a metadata stream including metadata associated with the at least one video frame and a second time code. The client computing device can extract the first timecode from the image data included in the video stream. The client computing device can determine an offset between the first timecode and the second timecode. The client computing device also can synchronize the video stream with the metadata stream, based on the offset between the first timecode and the second timecode.

20 Claims, 3 Drawing Sheets

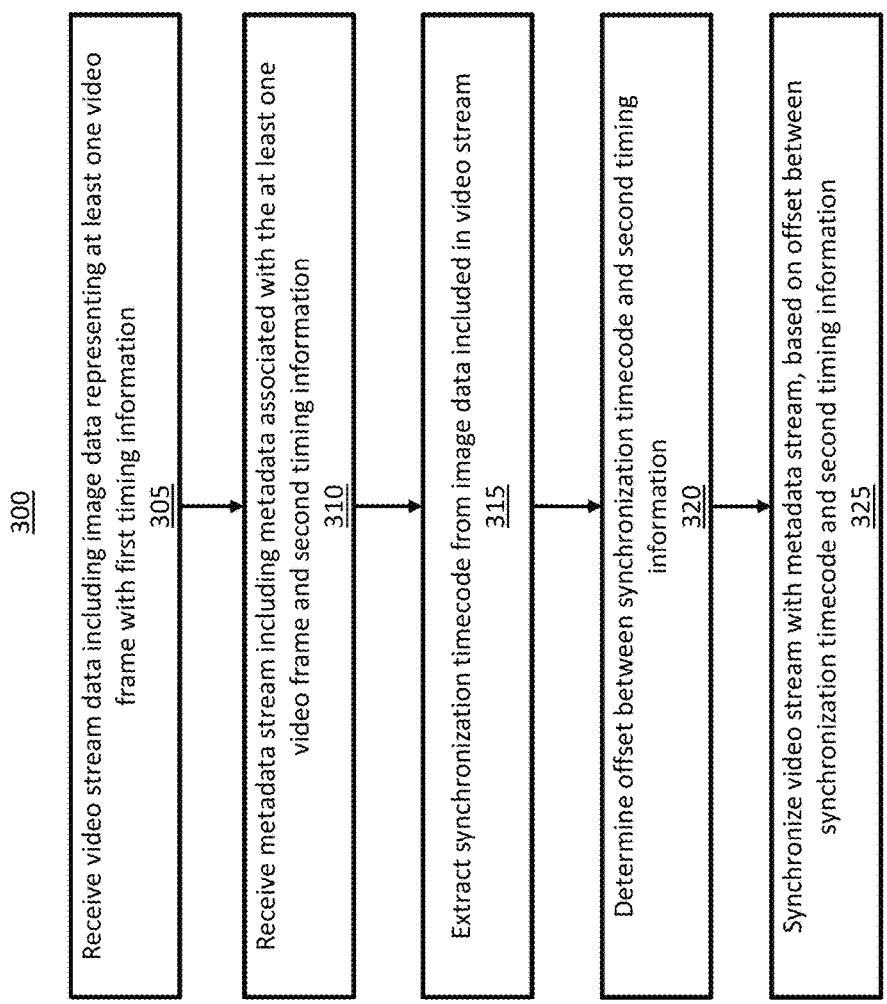

US 10,063,613 B2

SYSTEMS AND METHODS FOR UTILIZING CLIENT-SIDE SYNCHRONIZATION OF VIDEO AND OVERLAY

BACKGROUND

In a computer networking environment, data streams can be sent between computing devices interconnected within the network. For example, a client computing device may request information from a remote server communicatively coupled to the client computing device via a network such as the Internet. The server may respond to such a request by transmitting the requested information in the form of a data stream. In some instances, the server (or another computing device) also may provide one or more additional data streams to the client computing device. Each of the data streams may include sequential blocks of data, which may be related to one another with respect to precise timing. That is, a block of data from the first stream may correspond to a block of data from the second stream from a precise timing perspective. However, the nature of computer networking presents particular problems for synchronizing data streams that are transmitted from one or more servers to a client computing device. For example, blocks of data may not necessarily follow the same routes over networks, nor reach their destinations at the same times. The data blocks have to be reassembled and reconstructed by the client computing device. Significant technological difficulties are present due to potentially differing latencies, and it may be very difficult to determine which blocks of data in the two data streams correspond to one another. There is a need for technological advancements that permit the efficient and accurate synchronization by reassembly and reconstruction of two or more data streams.

SUMMARY

At least some embodiments are directed to a method for synchronizing data. The method can include receiving, by a client computing device, a video stream including image data representing a video frame. The image data also can include a first timing information. The method can include receiving, by the client computing device, a metadata stream including metadata associated with the video frame and second timing information. The method can include extracting, by the client computing device, the synchronization timecode from the image data included in the video stream. The method can include determining, by the client computing device, an offset between the synchronization timecode and the second timing information. The method can include synchronizing, by the client computing device, the video stream with the metadata stream, based on the offset between the synchronization timecode and the second timing information.

In some implementations, each of the synchronization timecode and the second timing information can be accurate to within at least one millisecond. In some implementations, the first timing information can include the synchronization timecode encoded within the image data of the video stream. In some implementations, each of the synchronization timecode and the second timing information can be represented as a 64-bit binary integer. In some implementations, the method can include encoding, by a video streaming engine remote from the client computing device, the synchronization timecode within the image data of the video stream.

In some implementations, the video stream can be provided to a live streaming system from the video streaming engine. The method can also include receiving, by the client computing device, the video stream from the live streaming system.

In some implementations, the video stream can correspond to video data representing a video game. In some implementations, the first timing information can include an encoding timecode generated at a fixed encoding rate. The method can include calculating, by client computing device, a duration of the video game, and deriving, by the client computing device, the encoding timecode based on the duration of the video game and the fixed encoding rate.

In some implementations, the method can include interpolating, by the client computing device, a video timecode associated with the video frame based on a previous video from of the video stream. The method can include determining, by the client computing device, a match between the interpolated video timecode and the second timing information. The method can include synchronizing, by the client computing device, the video stream with the metadata stream based in part on the match between the interpolated video timecode and the second timing information.

In some implementations, the metadata can include data relating to a position of a player within the video frame. In some implementations, the metadata can include data relating to a camera perspective of the video frame. In some implementations, the metadata can include data relating to elimination of players from the video game. In some implementations, the metadata can include data indicating that the video game has ended.

At least some embodiments are directed to a system for synchronizing data. The system can include a video streaming engine, a live streaming system, a data streaming engine, and a client computing device. The client computing device can be configured to receive, from the live streaming system, a video stream including image data representing a video frame. The image data can include a first timing information. The client computing device can be configured to receive, from the data streaming engine, a metadata stream including metadata associated with the video frame and second timing information. The client computing device can be configured to extract a synchronization timecode from the image data included in the video stream. The client computing device can be configured to determine an offset between the synchronization timecode and the second timing information. The client computing device can be configured to synchronize the video stream with the metadata stream, based on the offset between the synchronization timecode and the second timing information.

In some implementations, each of the synchronization timecode and the second timing information can be accurate to within at least one millisecond. In some implementations, the first timing information can include the synchronization timecode encoded within the image data of the video stream. In some implementations, each of the synchronization timecode and the second timing information can be represented as a 64-bit binary integer. In some implementations, the video streaming engine can be further configured to encode the synchronization time code within the image data of the video stream.

In some implementations, the video streaming engine can be further configured to provide the video stream to the live streaming system. The client computing device can be further configured to receive the video stream from the live streaming system.

In some implementations, the video stream can correspond to video data representing a video game. In some implementations, the first timing information can include an encoding timecode generated at a fixed encoding rate. The client computing device can be further configured to calculate a duration of the video game, and to derive the encoding timecode based on the duration of the video game and the fixed encoding rate.

In some implementations, the client computing device can be further configured to interpolate a video timecode associated with the video frame based on a previous video from of the video stream. The client computing device can be further configured to determine a match between the interpolated video timecode and the second timing information. The client computing device can be further configured to synchronize the video stream with the metadata stream based in part on the match between the interpolated video timecode and the second timing information.

In some implementations, the metadata can include data relating to a position of a player within the video frame. In some implementations, the metadata can include data relating to a camera perspective of the video frame. In some implementations, the metadata can include data relating to elimination of players from the video game. In some implementations, the metadata can include data indicating that the video game has ended.

At least some embodiments are directed to a system for synchronizing data. The system can include a video streaming engine. The video streaming engine can be configured to receive, from a game engine, a video stream including image data representing a video frame. The video streaming engine can be configured to generate a synchronization timecode associated with the video frame. The video streaming engine can be configured to encode the synchronization timecode into the image data of the video stream. The video streaming engine can be configured to transmit the video stream including the synchronization timecode to a live streaming system. The system also can include a data streaming engine configured to receive, from the game engine, a metadata stream including a data timecode. The data streaming engine can be configured to transmit the metadata stream including the data timecode to a client computing device. The client computing device can be capable of receiving the video stream including the synchronization timecode from the live streaming system. The client computing device can be capable of receiving the metadata stream including the data timecode from the data streaming engine. The client computing device can be capable of synchronizing the video stream with the metadata stream, based on the synchronization timecode encoded in the video stream and the data timecode included in the data stream.

In some implementations, the video stream can correspond to video data representing a video game. In some implementations, the metadata can include data relating to a position of a player within the video frame. In some implementations, the metadata can include data relating to a camera perspective of the video frame. In some implementations, the metadata can include data relating to elimination of players from the video game. In some implementations, the metadata can include data indicating that the video game has ended.

BRIEF DESCRIPTION OF THE DRAWINGS

Various objects, aspects, features, and advantages will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 3 is a of an example method for synchronizing data streams, according to some implementations.

The details of various embodiments of the methods and systems are set forth in the accompanying drawings and the description below.

DETAILED DESCRIPTION

In a computer networking environment, data streams may be sent between computing devices interconnected within the network. For example, a client computing device may request information from a remote server communicatively coupled to the client computing device via a network such as the Internet. The server may respond to such a request by transmitting the requested information in the form of a data stream. In some implementations, the server (or another computing device) also may provide one or more additional data streams to the client computing device. Each of the data streams may include sequential blocks of data, which may be related to one another with respect to timing. That is, a block of data from the first stream may correspond to a block of data from the second stream. However, there may be differing latencies in delivering the two data streams. Furthermore, the sequential blocks of data for each data stream may be sent at different rates, requiring the client computing device to recombine the sequential blocks of data in the correct order after the blocks have been received by the client device. Therefore, it may be difficult to determine which blocks of data in the two streams correspond to one another In some implementations, the data streams may relate to video game data. For example, one of the data streams may include video data showing gameplay for the video game. The second data stream may include metadata related to the video game. In some implementations, the metadata may relate to the positions of players or other objects within the video game. Alternatively, the second data stream may include metadata relating to a number of players who have been eliminated from the game, a camera perspective associated with the game, or information indicating that the game has ended. In some implementations, additional data streams also may be delivered to the client computing device, and may include any of the types of data described, as well as other types of data.

Determining accurate timing information for the data streams may be necessary for proper utilization. For example, the video game may allow players to move around within a virtual environment, and therefore both the video data and the metadata (e.g., data relating to the positions of various players within the virtual environment of the video game) may change over time in an interrelated fashion. Thus, it may be required that the data streams be synchronized with one another in order to correlate the video data with the appropriate corresponding metadata (e.g., positional data). However, due to differing arrival times of data elements for each stream, it may be difficult to synchronize the data streams.

Figure 1:
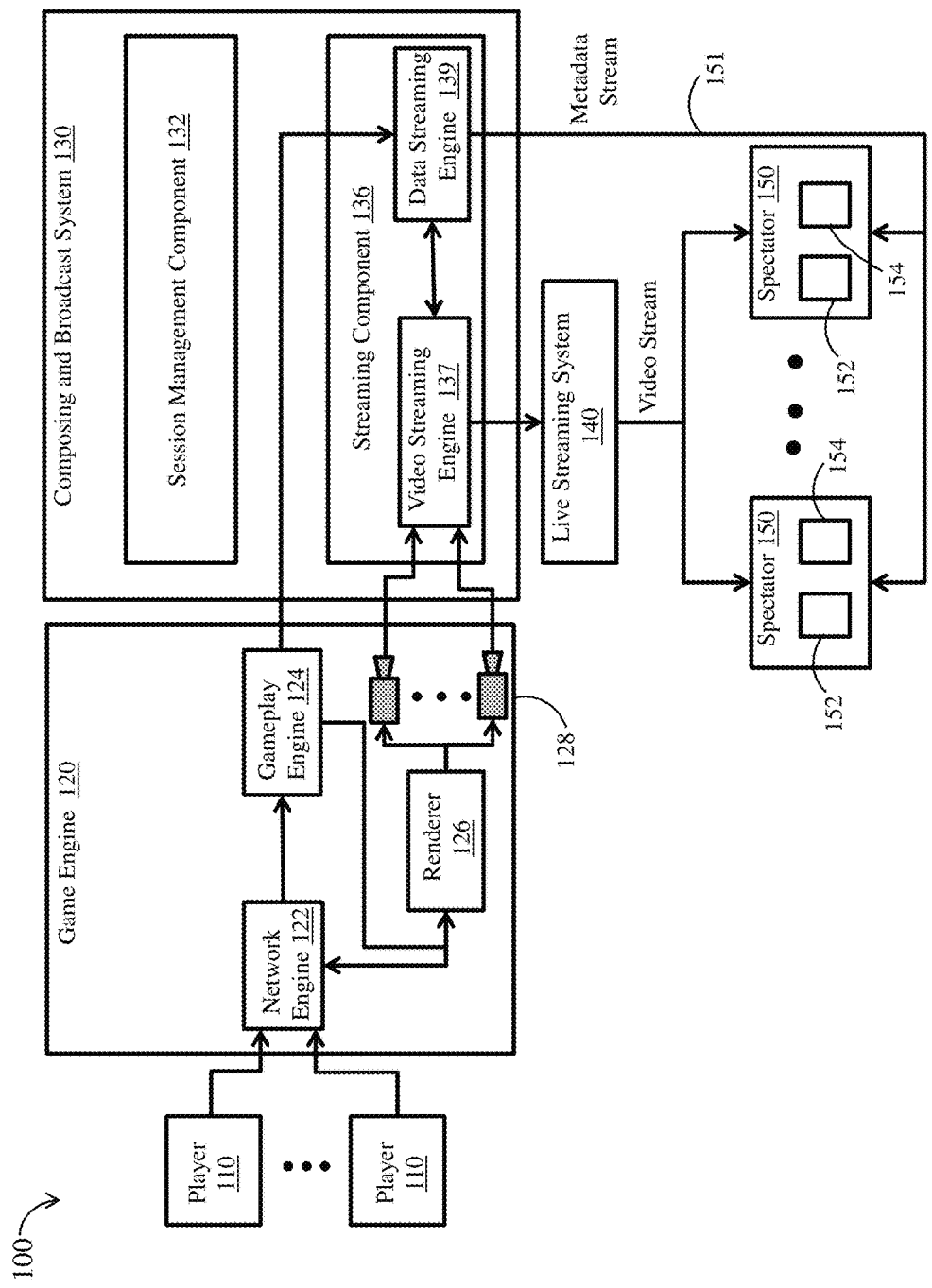
FIG. 1 is a block diagram illustrating a computer environment for streaming video games with interactive overlay, according to some embodiments.

FIG. 1 is a block diagram illustrating a computer environment 100 for streaming video games with interactive overlays, according to at least some embodiments. The computing environment 100 can be similar to the computing environment described in the patent application entitled "SYSTEMS AND METHODS OF VIDEO GAME STREAMING WITH INTERACTIVE OVERLAY AND ADDITIONAL DATA," U.S. Ser. No. 15/352,421which is incorporated herein by reference in its entirety. The computer environment 100 can include a plurality of player client devices 110, a game engine 120, a composing and broadcast system 130, a live streaming system 140, and a plurality of spectator client devices 150. The game engine 120 can include a network engine 122, a gameplay engine 124 and a render 126. The composing and broadcast system 130 can include a session management component 132, and a streaming component 136. The streaming component 136 can include one or more video streaming engines 137 and one or more data streaming engines 139.

The player client devices 110 can include an application, such as a browser or a gaming application to initiate and participate in an online game as a player. When participating in the online game, a player client application 110 can control one or more avatars in the game. In a multi-player game, separate player client devices 110 can control separate or distinct avatars. The application can allow initiating a live game streaming session to broadcast a game play online. The online game can be provided by the game engine 120.

The game engine 120 can include a software, running on one or more computing devices, for creating and developing a video game. The game engine 120 can include a network engine 122 for communicating with player client devices 110. The network engine 122 can establish communication channels between the game engine 120 and the player client devices 110, upon the player client devices 110 initiating a game session. The network engine 122 can transmit video streams of the game from the renderer 126 to the player client devices 110. Each player client device 110 can receive a respective video stream over a communication channel between that player client device 110 and the game engine 120. For each player client device 110, the respective received video stream can correspond to a viewpoint associated with an avatar controlled by that player client device 110. As a user of a player client device 110 interacts with the game, that player client device 110 can transmit signals indicative, or indications, of actions taken by the user to the network engine 122. The network engine 122 can forward the received signals or indications the gameplay engine 124.

The gameplay engine 124 can analyze the received signals or indications received from the player client device 110 to detect game events corresponding to the user actions. For example, the gameplay engine 124 can detect game events, such as motion, changes in player's viewpoint, collisions, kills, clicks on menu elements, or the like. The gameplay engine 124 can forward indications of the detected events to the renderer 126. The gameplay engine 124 can also maintain game data, such as scores, equipment, or other information associated with various players or graphical objects in the game. The gameplay engine 124 can transmit the game data (also referred to herein as metadata) or indications of some of the detected events to the composing and broadcast system 130.

The renderer 126 can generate a video sequence for each player (or each player client device 110), based on the viewpoint and the detected events associated with that player client device 110. The renderer 126 can forward generated video frames to the network engine 122 for steaming to the player client devices 110. The renderer 126 may also generate other video sequences corresponding to additional viewpoints associated with virtual cameras (e.g., not associated with players or player avatars). The renderer 126 can transmit generated video frames from the various video sequences 128, e.g., associated with players and virtual cameras, to the composing and broadcast system 130.

The composing and broadcast system 130 can include one or more computer servers (e.g., Linux servers) for executing a cluster of virtual servers (both not shown in FIG. 1) for each video/audio stream, e.g., associated with a respective game and a group of players or player client devices 110. The composing and broadcast system 130 can execute a plurality of clusters of virtual servers, associated with a respective plurality of video/audio streams (or game broadcast sessions), simultaneously. The cluster of virtual servers can handle three types of data; commands received either from the game engine 120 to create (or terminate) a game broadcast session or from spectator client devices 150 to access the game broadcast session, game and events data received either from the game engine 120 or collected from the spectator client devices 110. The cluster of virtual servers can include three different types of virtual servers for running or executing different types of services (or processes). The three types of virtual servers can include supervisor servers, internal worker servers, and public worker servers. Services provided or executed by the cluster can include streaming services, control services, communication services, authentication services, event services, or a combination thereof.

The supervisor servers can supervise and coordinate the services (or processes) running on the worker servers (e.g., internal ad public worker servers). The supervisor servers can be a small group of micro servers that act as a point of registration and authority, or orchestration, for all the other services. While a single supervisor server may be enough, it may be desirable to have three or more supervisor servers are to achieve high availability of the cluster. The group of supervisor servers can keep the state of orchestration services consistent using, for example, a gossip protocol with a simple majority. The consistency between various supervisor servers with respect to the state of orchestration allows for half of the supervisor servers to go down without affecting the services provided or executed by the cluster. The supervisor servers can run or execute tasks such as, High-Available Key-Value store for configuration, registration service(s), monitoring service(s), scheduler service(s), or a combination thereof. The registration services relate to the mechanisms or tools provided to allow the game engine 120 or the player client applications 110 to register or initiate a game broadcast session. Registration service(s) can be exposed to the game engine 120 (or player client devices 110) through a domain name system (DNS) and/or a hypertext transfer protocol (HTTP) application program interface (API). The supervisor servers can monitor other services (or processes) executed by internal and public worker servers and report the health of the different worker server instances. The scheduler service(s) can include scaling up and down the different services (e.g., executed by the worker servers) and restart them when they go down. The supervisor servers may be designed not to run or execute other tasks, instead the supervisor servers can delegate such other tasks to the worker servers.

The internal and public worker servers can be configured to execute and monitor the tasks scheduled by the supervisor servers. The difference between the public and internal workers is that only the public workers can be accessible from an external, unregistered Internet protocol (IP) address. The internal workers can be accessible to a limited set of pre-registered network range (e.g., IP addresses associated with the game engine 120), as a security precaution. The public worker servers can be configured to execute processes and tasks related mainly to the spectator client devices 150, whereas the internal worker servers can execute processes and tasks associated with the gaming engine 120. Given that the number of spectator client devices 150 can be relatively large (e.g., compared to the number of player client devices 110), the cluster can include a larger number of running instances of public worker servers than the internal worker servers. Both public and internal worker servers can run a client version of the orchestration services to report to the supervisor servers. The supervisor servers can be configured to automatically provision, allocate, or de-allocate worker servers as the load of processes (or services) goes up and down. Since, the internal worker servers handle mainly services related to the game engine 120, the internal worker servers can have a more stable load than public worker servers. The load of public worker servers can be proportional to the number of spectator client devices 150. As spectators connect or drop off, the load of public worker servers can vary dynamically over time.

The use of virtual servers to implement the composing and broadcast system 130 can allow for dynamic system scalability whether in terms of the number of clusters running or the number of virtual servers in each cluster. The composing and broadcast system 130 may allocate a respective cluster of virtual servers for each initiated game broadcast session, and de-allocate that cluster once the game broadcast session is terminated. Also, the supervisor servers in each cluster can dynamically allocate or de-allocate worker servers as the load of running services (or the number of spectator client devices 150) increases or decreases. In some embodiments, the composing and broadcast system 130 can be implemented as a software development kit (SDK) that is integrated with the game engine 120.

While some implementations involve virtual servers, such implementations should not be interpreted as limiting, and other implementations are contemplated by some other embodiments. For example, the composing and broadcast system 130 can run (or execute) on one or more player client devices 110. The player client device(s) 110 can still transmit the game video stream(s) to the live streaming system 140, and transmit game data (or metadata) to one or more engines associated with the live streaming system 140 for multicasting to the spectator client devices 150.

The composing and broadcast system 130 can include a session management component 132. The session management component 132 can be configured to provide and manage various services (or processes) including control service(s), user authentication service(s), and communication service(s). Control Service(s) can provide the point of entry for the game engine 120 to other services of the composing and broadcast system 130. The control service(s) can allow the game engine 120 to register a new stream (or new game broadcast session) and request for new channel endpoint. The control service(s) can also provide information about the health of the cluster via an administrative interface associated with, for example, the game engine 120. An administrator of the game engine 120 can monitor and administrate the cluster via the administrative interface. The control service(s) can also provide information related to registered streams (e.g., registered for live streaming) to be published for spectator client devices 150 or other client devices.

Authentication service(s) (or process(es)) can allow client devices to query the composing and broadcast system 130 about current streams playing (if any) and to request a new entry point for the streaming service(s) provided by the streaming component 136. The communication service(s) (or process(es)) can include handling with the spectator client devices 150. In particular, the communication service(s) can include establishing and/or terminating communication channels 151 with spectator client devices 150 as such devices connect to or disconnect from the composing and broadcast system 130. The established communication channels 151 can be bi-directional and carry game data received, for example, from the gameplay engine 124 to spectator client devices 150, or carry indications of user interactions from the spectator client devices 150 to the composing and broadcast system 130.

The streaming component 136 can include a plurality of streaming engines including one or more video streaming engines 137 and one or more data streaming engines 139. In some embodiments, the video streaming engine(s) 137 and the data streaming engine(s) can include (or can be implemented using) public worker servers. The video streaming engine(s) 137 can receive a plurality of video game streams 128 from the renderer 126, each corresponding to a respective viewpoint. Each received video game stream can include a respective video stream and a respective audio stream. The video streaming engine(s) 137 can select one of the video game streams, encode respective video and audio frames into compressed video/audio frames, and transmit the video/audio frames to the live streaming system 140. The video streaming engine(s) 137 can encode the video data of the selected video game stream, for example, using H.264/MPEG-4 AVC or some other video compression standard. The video streaming engine(s) 137 may also encode the audio audio of the selected video game stream, for example, using MPEG-2 Audio Layer III (MP3), Advanced Auso Coding (AAC), or another audio coding format. In some implementations, the video The data streaming engine 139 can be configured to receive game data received from the gameplay engine 124. In some embodiments, the data streaming engine 139 can generate data frames, based on game data received from the gameplay engine 124, according to a predefined format. The data streaming engine 139 may also filter the game data received from the gameplay engine 124 when generating the data frames. Each data frame can include a respective timestamp (or time code) to synchronize the data frame with a respective video game (or video/audio) frame. The timestamp associated with each data frame can allow placing that data frame within a game data stream and mapping that data frame to the corresponding video game frame. The data streaming engine 139 can communicate with the video streaming engine 137 to coordinate allocation of timestamps to video game frames and data frames. A data frame can include information indicative of positions(s) of one or more graphical objects within the corresponding video frame, viewpoint information, game event information, list of players or player avatars, or a combination thereof. The data streaming engine(s) 139 can stream the data frames carrying game data (or metadata) to the plurality of spectator client devices 150 through respective communication channels 151. The data streaming engine(s) 139 can stream the data frames according to the respective time frames.

The live streaming system 140 can include a live game streaming platform such as Twitch, Ustream, YouTube Gaming, or the like. The live streaming system 140 can receive the video game frames from the video streaming engine 137, and broadcast the video game frames, e.g., via a respective web page, to the spectator client devices 150. The live streaming system 140 can modify the timestamps of the video game frames before broadcasting to the spectator client devices 150.

Each spectator client device 150 can include an application 152 for playing the video game stream received from the live streaming system 140, and one or more software scripts 154 for generating and displaying an overlay based at least on the data stream received from the data streaming engine 139. The software script(s) can include, for example, a Java script and/or one or more other software modules. The software script 154 can cause the spectator client device 150 to scan each data frame received to retrieve the respective timestamp and position information for one or more graphical objects (e.g., one or more player avatars). The software script(s) 154 can compare the retrieved timestamp to one or more timestamps associated with the video game frames to map the scanned data frame to the corresponding video game frame. Since the data stream and the video game stream are received from distinct sources through distinct communications paths, the spectator client device 150 may apply synchronization techniques such as described in connection with FIGS. 2 and 3.

Upon determining a video frame corresponding to the scanned data frame, the software script(s) 154 can cause the spectator client device 150 to display an interactive overlay over the determined video frame, based on the position of a graphical object in the determined video game frame. In some embodiments, the software script(s) 154 can cause the spectator client device 150 to display a plurality of interactive overlays, for example, each associated with a respective player avatar. The user of the spectator client device 150 can interact with the interactive overlay, for example, by clicking, touching, or hovering over the graphical object (or a screen area associated therewith) whose position is used to place the interactive overlay over the determined video frame.

The interactive overlay can allow the user of the spectator client device 150 to interact with the displayed video game frames in a variety of ways. Also, synchronizing the interactive overlay temporally and spatially with a graphical object (e.g., a player avatar) can allow the spectator users to customize or personalize their views of the game (e.g., local customization at the spectator client device 150) in a meaningful an fun way. The interactive features provided by the overlay can provide spectator users a satisfying and entertaining viewer experience.

The software script(s) 154 can be configured to transmit indications of user interactions with the overlay and or indications of user comments (e.g., via chat) to the composing and broadcast system 130. The composing and broadcast system 130 can use such indications, for example, to adapt or adjust the video game stream streamed to the spectator client devices 150 as described in the patent application entitled "SYSTEMS AND METHODS FOR FOR VIDEO GAME STREAMING UTILIZING FEEDBACK AND AGGREGATION OF VIEWER INTERESTS AND INTERACTIONS," U.S. Ser. No. 15/352,441, which is incorporated herein by reference in its entirety.

Referring again to FIG. 1, the spectator client devices 150 may receive a video stream from the live streaming system 140, and may receive a metadata stream from the data streaming engine 139. In some implementations, the video stream also may include audio data. In some implementations, the spectator client devices 150 also may be receive additional data streams from the data streaming engine 139 (e.g., a third data stream, a fourth data stream, a fifth data stream, a sixth data stream, a seventh data stream, etc.), and some or all of the data streams may be interrelated to one another over time. Because the video stream and the metadata stream are delivered to the spectator client devices 150 by different computing devices, portions of each of these data streams, sometimes referred to as data chunks, may arrive asynchronously with respect to one another at a spectator client device 150.

Additional factors also can further complicate synchronization. For example, in some implementations the game engine 120 may generate a data timecode associated with the video game streams that are provided to the composing and broadcast system 130. The streaming component 136 may encode the video and audio frames received from the broadcast system 130 into encoded video and audio data along with the data timecode. Such encoding may be performed with a fixed encoding rate, which may result in some of the encoded frames being dropped or duplicated. To address this issue, the streaming component 136 can also generate a new encoding timecode for each frame, which may be associated with a single respective data timecode. The streaming component 136 also can generate a new timestamp, referred to as the egress timestamp. Together, the data timecode, the encoding timecode, and the egress timestamp can form an encoding time block, which can be sent to the live streaming system 140 along with a respective video and/or audio frame. In some implementations, the egress timestamp can refer to the time at which the encoding time block is sent to the live streaming service, and may include a dynamic offset to take into account network round-trip time and other sources of latency.

In some implementations, the video streaming engine 137 also can be configured to encode a synchronization timecode into the video data before the video data is provided to the live streaming system 140. In some implementations, the synchronization timecode can be encoded in a manner that allows the synchronization timecode to be preserved even after the video data is processed by the live streaming system 140 and delivered to a spectator client device 150 in the video data stream. For example, even if the live streaming system 140 adds its own independent timestamp information to data chunks in the video stream, the synchronization timecode encoded by the video streaming engine 137 may persist such that it can be decoded after it is received by a spectator client device 150.

In some implementations, a data stream including metadata can be provided by the gameplay engine 124 to the data streaming engine 139, as shown in FIG. 1. This data stream also can include a data timecode for each frame, similar to the data timecode associated with audio and video frames sent by the game engine 120 to the video streaming engine 137. Thus, in some implementations, the composing and broadcast system 130 also can implement a synchronizing feature that may capture the egress timestamp and its associated encoding timecode block, and can then select the data frame associated with the same timecode block. The video streaming engine 137 and the data streaming engine 139 can then transmit their respective data streams (i.e., a video and/or audio data stream for the video streaming engine 137, and a metadata stream for the data streaming engine 139) in a synchronized manner.

In some implementations, the spectator client devices 150 can receive the video stream (which may include both audio and/or video data) from the live streaming system 140. The video stream can be decoded by the spectator client devices 150 and subsequently rendered on the spectator client devices 150. The decoding and rendering processes may add additional latency even relative to the egress timestamp, which can include a dynamic offset to attempt to account for latency. As a result, it may be difficult for the spectator 150 to correctly associate frames from the video stream with frames form the metadata stream.

To address this issue, each spectator client device 150 can be configured to recuperate at least one of an ingress timestamp, the encoding timecode, or the data timecode for each frame of the video stream and the metadata stream. For example, in some implementations, the spectator client device 150 can be configured to retrieve the ingress timestamp directly from a video player application such as the application 152 executing on the spectator client device 150. The spectator client device 150 also can be configured to recuperate an offset between the ingress timestamp and a current time, and can therefore calculate the ingress timestamp from this offset. In some implementations, the spectator client device 150 can calculate the duration of the video stream and the metadata stream from the start of the video game. Then, the spectator client device can calculate the encoding timecode based on the duration of the video stream and the metadata stream and the fixed encoding rate used by the streaming component 136 to generate the encoding timecode.

In some implementations, each spectator client device 150 also may be configured to decode or otherwise extract the synchronization timecode from the video data chunks within the video data stream. The synchronization timecode may be encoded directly within image data of the video stream. In some implementations, the video streaming engine 137 can be configured to encode such information as a watermark in the image data associated with each video data chunk. For example, data corresponding to one or more pixel values of an image frame may be replaced with data representing a synchronization timecode associated with that image frame. In some implementations, each pixel value may be represented as a binary number having various color components, such as red, green, and blue color components. Each color component may have a fixed size, such as eight bits. Thus, in this example, each pixel value can be represented using a total 24 bits, with the red component for each pixel represented by the first eight bits of the pixel value, the green component represented by the second eight bits of the pixel value, and the blue component represented by the last eight bits of the pixel value. The video streaming engine 137 can be configured to replace such color information with synchronization timecode information for one or more pixels of each image frame. Because the synchronization timecode information can be contained within a relatively small number of pixels (e.g., one pixel, two pixels, three pixels, four pixels, or five pixels), such an encoding scheme may be visually imperceptible to the human eye, thereby allowing the synchronization timecode information to be encoded within the image data for a video frame without substantially degrading the quality of the image represented by the image data. In some implementations, the number of pixels dedicated to the synchronization encoded timecode may be selected based on part on the format for the synchronization timecode. For example, if the synchronization timecode can be represented using a number of bits that is less than the number of bits for a single pixel value, then the video streaming engine 137 may encode the synchronization timecode within a single bit of each image frame. In some implementations, the synchronization timecode may be represented using a number of bits that exceeds the number of bits for a single pixel value. In such implementations, two or more pixels may be dedicated to storing the encoded synchronization timecode information. For example, the image data corresponding to two adjacent pixels in an image frame may be replaced with the synchronization timecode information.

It should be understood that the example encoding schemes for the synchronization timecode are illustrative only, and that various formats and sizes may be used for pixel values and for synchronization timecodes in various implementations. For example, pixel values may be represented using any number of bits, such as 8 bits, 16 bits, 24 bits, 32 bits, or 64 bits. Similarly, synchronization timecodes for each image frame may be represented using any number of bits, such as 8 bits, 16 bits, 24 bits, 32 bits, 64 bits, or 128 bits. In some implementations, the synchronization timecode can be represented as a binary integer denoting an elapsed time from the beginning of the video data stream (e.g., the start time of a video game corresponding to the video data stream). In some implementations, the synchronization timecode can match the encoding timecode for a particular frame. The size of the synchronization timecode may be selected based in part on a minimum required timing accuracy threshold. For example, a larger format for the synchronization timecode (i.e., a higher bit count for the synchronization timecode representation) may allow for more accurate timing resolution. In some implementations, the synchronization timecode can be formatted in a manner that allows for timing accuracy to be determined within about one millisecond. It should also be noted that, in some implementations, a synchronization timecode may not be encoded within every image frame. For example, in some implementations, data chunks for the video data stream may each include information corresponding to multiple image frames, and only a subset of the image frames may include encoded synchronization timecode information. In some implementations, only a single image frame for each data chunk may include encoded synchronization timecode information. In general, an image frame including an encoded synchronization timecode may be referred to as a synchronization frame.

In some implementations, each spectator client device 150 can be configured to extract synchronization timecode information from the video data stream. For example, each spectator client device 150 may be provided with computer executable instructions which, when executed by a the spectator client device 150, cause the spectator client device 150 to extract the synchronization timecode from each data chunk of the video data stream. In each video frame including encoded synchronization timecode information, the synchronization timecode may be encoded in the pixel data for a predetermined pixel or a predetermined set of pixels. The processor associated with the spectator client device 150 can be configured to parse the video data, examine the pixel value for the predetermined pixel or set of pixels, and extract the encoded synchronization timecode information.

After the synchronization timecode has been extracted from the video stream, the spectator client device 150 can be configured to compare the extracted synchronization timecode to the encoding timecode associated with the metadata. Based on this comparison, the spectator client device 150 can synchronize the video data stream with the metadata stream. For example, the spectator client device 150 can determine a match between the synchronization timecode extracted from a data chunk of the video data stream and the encoding timecode of a data chunk of the metadata stream, and can therefore determine that the data chunks having matching synchronization timecodes and data timecodes, respectively, correspond to one another, even if they were received at different times.

In some implementations, the timing recuperation techniques, which may be performed by the spectator client device 150, may not yield sufficient synchronization between frames of the video stream and frames of the metadata stream. Thus, in some implementations, the spectator client device 150 also may implement an interpolation mechanism based on past frames that can be used to determine an intermediate encoding timecode or ingress timestamp. For example, if an ingress timestamp is obtained, it can be matched against the egress timestamp received in the video stream and the metadata stream. In some implementations, an offset may be included to take into account network latency and buffering. Then the spectator client device 150 can convert this information to an encoding timecode, which can be matched with the data frame having the corresponding data timecode in the metadata stream.

Figure 2:
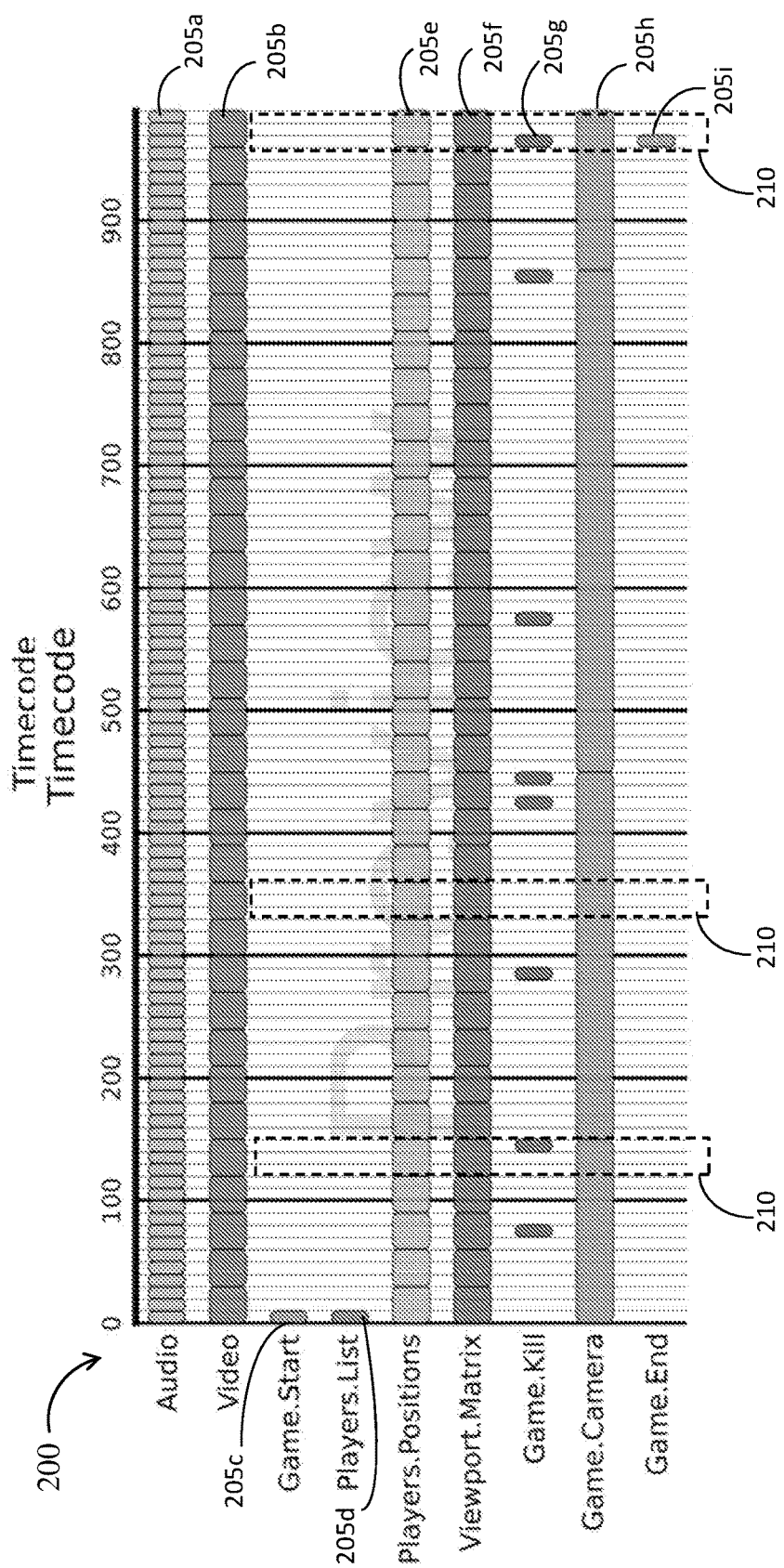
FIG. 2 is a graphical representation of several example data streams, according to some implementations.

FIG. 2 is a graphical representation 200 of several example data streams 205a-205i (generally referred to as data streams 205), according to some embodiments. The data streams 205 are shown along a time (or timecode) axis which starts from zero on the left hand side of FIG. 2. Each data stream 205 can include one or more data chunks, each of which corresponds to a particular time instant/interval (or timecode). The video and audio streams 205a and 205b can be generated and provided by the renderer 126, whereas the streams 205c-205i can be transmitted by the gameplay engine 124 to the data streaming engine 139.

Since the renderer 126 can generate and provide a plurality of video game streams (e.g., each including a video stream 205a and an audio stream 205b) associated with the plurality of viewpoints 128, the gameplay engine 124 can provide a single instance of each the streams 205c-205i or can provide a plurality of instances of at least one of the streams 205c-205i. For instance, the gameplay engine 124 can provide a plurality of streams 205f, each associated with a respective viewpoint 128. In some embodiments, the gameplay engine 124 can provide the data streaming engine 139 with a separate set of streams 205e-205g or 205e-205f for each viewpoint 128.

Each of the streams 205 can include a common stream identifier (ID). The stream ID can be indicative of (or can identify) the stream registered, e.g., for live streaming, by the player client devices 110 or by the game engine 120. For instance, upon request from one of the player client devices 110 to live stream the respective game play, the game engine 120 can initiate stream or game play) registration with the composing and broadcast system 130. The game engine 120 may, for example, identify a video frame rate and/or a bit rate as part of the stream (or game play) registration process. The composing and broadcast system 130 can assign a stream ID to identify all streams 205 associated with game play. The composing and broadcast system 130 can provide the assigned stream ID to the game engine 120, and the gameplay engine 124 and the renderer 126 can insert the stream ID in all streams 205. The stream ID can allow the composing and the broadcast system 130 to map the streams 205 to one another and to the game play associated with the player client device(s) 110.

Also, the gameplay engine 124 and the renderer 126 may insert a respective timestamp in each data chunk of the streams 205. For example, the gameplay engine 124 and the renderer 126 may embed the timestamps (or timecode information) in a header associated with each data chunk. The time stamps can allow streaming video and audio frames as well as data chunks/frames to spectator client devices in the right order. Also, the timestamps can allow computing devices receiving the data streams 205 (or data associated therewith) to synchronize the data chunks across various data streams 205. It should be understood that FIG. 2 is illustrative only, and that in some implementations, additional or different data streams 205 may be included without departing from the scope of this disclosure.

The data streaming engine 139 can generate one or more game data streams, for example, based on data in streams 205c-205i, for streaming to the spectator client devices 150 via the respective channels 151. For example, the data streaming engine 139 can generate a single game data stream by combining concurrent data chunks from streams 205c-205i (or a subset thereof) into a single data frame 210. The generated game data stream can include data frames 210 that coincide in time and duration with the video frames in the stream 205b. The size of the data frames 210 can vary over time. For example, event data from stream 205g, which indicates events occurring in the game, may not appear in each data frame 210. Also, the Game.Start data stream 205c can include a single data chunk associated with timecode 0, which can mark the beginning of the video game. Similarly, the Players.List data stream 205d can include a single data chunk associated with timecode 0. The Players.List data stream 205d can include information such as a total number of players in the video game, as well as information relating to each of the players, such as unique identification information (e.g., respective avatar name) and character information for each player. The Game.Start data and the Players.List data may appear, for example, only in the first data frame 210 of the data stream generated by the data streaming engine 139. The data streaming engine 139 can insert the stream ID and a single timestamp (e.g., timestamp from corresponding Players.Positions data chunk or corresponding Viewport.Matrix data chunk) in each data frame 210. Also, the same stream ID can be embedded (e.g., by the rendered 126 or the video streaming engine 137) in the corresponding game video stream provided to the live streaming system 140.

The data streaming engine 139 can generate the game data stream in one of various other ways. For example, the data streaming engine 139 may generate a first game data stream including only Players.Positions data from stream 205e and Viewport.Matrix data from stream 205f. The Players.Positions data stream 205e can include data indicative of the positions of the various players (or player avatars) within a virtual environment of the video game. For a given player avatar (or graphical object) in the online game, the respective Players.Positions data can be indicative of a pixel region (e.g., a rectangle) representative of the location of that player avatar (or graphical object) in a specific video frame of the stream 205b. The Viewport.Matrix data stream 205f can include information related to the viewpoint 128 associated with the video stream 205a. The data streaming engine 139 may embed Viewport.Matrix data associated with various players (player avatars) and/or various virtual cameras in the online game in each data frame 210.

Because the position of each player may change in every video frame, the Players.Positions data stream 205e can be updated at the same rate as the video data stream 205b. This information also can be expected to change at the same rate as the video data stream 205b and the Players.Positions data stream 205e. Like the Players.Positions data stream 205e, the Viewport.Matrix data stream 205f also can be updated at the same rate as the video data stream 205b.

The Game.Kill data stream 205g can include information relating to the elimination (or killing) of players (or player avatars) from the video game. This data is asynchronous and non-continuous, because it is only updated as players are eliminated from the video game. In some implementations, each data chunk of the Game.Kill data stream 205h can include an identification of the player who has been eliminated. In some implementations, the information included in the Game.Kill data stream 205g can be used along with the information in the Players.List data stream 205d to track the number of players who are still remaining in the game. In general, the data stream 205g can be indicative of game events (e.g., not necessarily restricted to killing events) and may be referred to as Events data stream 205g. The game events' data can include additional information for various players, such as respective game scores, equipment, health states, emotional states, the like, or a combination thereof.

The Game.Camera data stream 205h can include information relating to the viewpoint 128 corresponding to the video game stream selected and transmitted from the composing and broadcast system 130 to the live streaming system 140 for display on the spectator client devices 150. In some implementations, a new data chunk may be included in the Game.Camera data stream 205h each time the selected video game stream or the corresponding viewpoint 128 (or camera perspective) provided to spectators changes. When the video game stream selected for broadcasting to client devices 150 changes, the video streaming engine 137 can halt transmitting streaming video/audio frames from the previously selected stream and start transmitting video/audio frames from the new selected stream to the live streaming system 140 for broadcasting to the client devices 150. In some implementations, the camera perspective shown to spectators may be the same as the perspective seen by one of the individual players as identified by the Viewport.Matrix data stream 205f. However, in some instances, the camera perspective shown to spectators may correspond to a virtual camera that is not associated with any of the individual players.

The Game.End data stream 205i includes a single data chunk, which can mark the end of the video game. In some implementations, the data chunk for the Game.End data stream 205i can be sent after every player has been eliminated from the game. In some other implementations, the data chunk for the Game.End data stream 205i can be sent after a predetermined period of time has elapsed since the start of the game, even if there are players who have not yet been eliminated from the game.

In some embodiments, the data streaming engine 139 can generate a second game data stream based on the streams 205c, 205d, and 205g-205i. The data streaming engine 139 can combine data chunks from these streams to generate an asynchronous stream indicative of various events associated with the online game. In some embodiments, the data streaming engine 139 can stream the streams 205c-205i separately to the spectator client devices 150, for example, through various logic communication channels.

FIG. 3 is a of an example method 300 for synchronizing data streams, according to one implementation. The method 300 includes receiving a video stream including image data representing at least one video frame with first timing information (step 305). In some implementations, this step can be performed by the spectator client device 150 shown in FIG. 1. The video stream can be, for example, a stream of data chunks including image data for a video game. The image data also can include first timing information, which may include a synchronization timecode encoded within the image data. In some implementations, a computing device such as the video streaming engine 137 shown in FIG. 1 can be configured to encode such information as a watermark in the image data associated with each video data chunk. For example, data corresponding to one or more pixel values of an image frame may be replaced with data representing a synchronization timecode associated with that image frame. Because the synchronization timecode can be contained within a relatively small number of pixels, such an encoding may be visually imperceptible to the human eye, thereby allowing the synchronization timecode to be encoded within the image data for a video frame without substantially degrading the quality of the image represented by the image data.

The method can include receiving, by the client computing device, a metadata stream including metadata associated with the at least one video frame and second timing information (step 310). In some implementations, the metadata stream can include any of the data streams 205 in connection with FIG. 2. For example, the video stream may include video content corresponding to a video game. The metadata stream can include data relating to the time at which the video games starts of ends, information identifying players in the video game, information identifying the positions of each player within the video game, information corresponding to camera perspectives for spectators and for each individual player in the video game, and information corresponding to the elimination of players during the course of the video game. In some implementations, the metadata stream can be formed from one or more data chunks, and the second timing information for each data chunk can include a respective timecode.

The method can include extracting, by the client computing device, the synchronization timecode from the image data included in the video stream (step 315). For example, each client computing device may be provided with computer executable instructions which, when executed by a processor, cause the processor to extract the synchronization timecode from each data chunk of the video data stream. In each video frame that includes an encoded synchronization timecode, the synchronization timecode may be encoded in the pixel data for a predetermined pixel or a predetermined set of pixels. The client computing device can be configured to parse the video data, examine the pixel value for the predetermined pixel or set of pixels, and extract the encoded synchronization timecode.

The method can include determining, by the client computing device, an offset between the synchronization timecode and the second timing information (step 320). For example, the client computing device can perform a comparison of the synchronization timecode with the second timing information, which may include a second timecode. Based on this comparison, the client computing device can determine a timing offset between the synchronization timecode and the second timing information. The offset may result, for example, from a difference in latency between the video stream and the metadata stream.

The method can include synchronizing, by the client computing device, the video stream with the metadata stream, based on the offset between the synchronization timecode and the second timing information (step 325). In some implementations, the client computing device can delay processing of metadata stream by an amount of time equal to the offset between the synchronization timecode and the second timing information to achieve synchronization between the metadata stream and the video stream. In some other implementations, the client computing device can determine a match between the synchronization timecode extracted from a data chunk of the video data stream and the timecode of a data chunk of the metadata stream, and can therefore determine that the data chunks having matching timecodes correspond to one another, even if they were received at different times.

It should be understood that some embodiments may provide multiple ones of any or each of those components and these components may be provided on either a stand-alone machine or, in some embodiments, on multiple machines in a distributed system. The systems and methods may be implemented as a method, apparatus or article of manufacture using programming and/or engineering techniques to produce software, firmware, hardware, or any combination thereof. In addition, the systems and methods may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the embodiments, methods, and examples, but by all embodiments and methods within the scope and spirit of the disclosure.

What is claimed is:

1. A system for synchronizing data, the system comprising a video streaming engine, a live streaming system, a data streaming engine, and a client computing device, wherein the client computing device is configured to:
    receive, from the live streaming system, a video stream including image data representing a video frame, wherein the image data further comprises first timing information;
    receive, from the data streaming engine, a metadata stream including metadata associated with the video frame and second timing information;
    extract a synchronization timecode from the image data included in the video stream;
    determine an offset between the synchronization timecode and the second timing information; and
    synchronize the video stream with the metadata stream, based on the offset between the synchronization timecode and the second timing information.

2. The system of claim 1, wherein the first timing information comprises the synchronization timecode encoded within the image data of the video stream.

3. The system of claim 1, wherein the video streaming engine is further configured to encode the synchronization timecode within the image data of the video stream.

4. The system of claim 3, wherein:
    the video streaming engine is further configured to provide the video stream to the live streaming system; and
    the client computing device is further configured to receive the video stream from the live streaming system.

5. The system of claim 1, wherein the video stream corresponds to video data representing a video game.

6. The system of claim 5, wherein the first timing information comprises an encoding timecode generated at a fixed encoding rate, and wherein the client computing device is further configured to:
    calculate a duration of the video game; and
    derive the encoding timecode based on the duration of the video game and the fixed encoding rate.

7. The system of claim 5, wherein the client computing device is further configured to:
    interpolate, a video timecode associated with the video frame based on a previous video from of the video stream,
    determine a match between the interpolated video timecode and the second timing information; and
    synchronize the video stream with the metadata stream based in part on the match between the interpolated video timecode and the second timing information.

8. The system of claim 5, wherein the metadata comprises data relating to a position of a player within the video frame.

9. A method for synchronizing data, the method comprising:
    receiving, by a client computing device, a video stream including image data representing a video frame, wherein the image data further comprises first timing information;
    receiving, by the client computing device, a metadata stream including metadata associated with the video frame and second timing information;
    extracting, by the client computing device, a synchronization timecode from the image data included in the video stream;
    determining, by the client computing device, an offset between the synchronization timecode and the second timing information; and
    synchronizing, by the client computing device, the video stream with the metadata stream, based on the offset between the synchronization timecode and the second timing information.

10. The method of claim 9, wherein the first timing information comprises the synchronization timecode encoded within the image data of the video stream.

11. The method of claim 9, further comprising encoding, by a video streaming engine remote from the client computing device, the synchronization timecode within the image data of the video stream.

12. The method of claim 11, wherein the video stream is provided to a live streaming system from the video streaming engine, the method further comprising receiving, by the client computing device, the video stream from the live streaming system.

13. The method of claim 9, wherein the video stream corresponds to video data representing a video game.

14. The method of claim 13, wherein the first timing information comprises an encoding timecode generated at a fixed encoding rate, the method further comprising:
calculating, by client computing device, a duration of the video game; and
deriving, by the client computing device, the encoding timecode based on the duration of the video game and the fixed encoding rate.

15. The method of claim 13, further comprising:
interpolating, by the client computing device, a video timecode associated with the video frame based on a previous video from of the video stream,
determining, by the client computing device, a match between the interpolated video timecode and the second timing information; and
synchronizing, by the client computing device, the video stream with the metadata stream based in part on the match between the interpolated video timecode and the second timing information.

16. A system for synchronizing data, the system comprising:
a video streaming engine configured to:
receive, from a game engine, a video stream including image data representing a video frame;
generate a synchronization timecode associated with the video frame;
encode the synchronization timecode into the image data of the video stream; and
transmit the video stream including the synchronization timecode to a live streaming system; and
a data streaming engine configured to:
receive, from the game engine, a metadata stream including a data timecode;
transmit the metadata stream including the data timecode to a client computing device, wherein:
the client computing device is capable of:
receiving the video stream including the synchronization timecode from the live streaming system;
receiving the metadata stream including the data timecode from the data streaming engine; and
synchronizing the video stream with the metadata stream, based on the synchronization timecode encoded in the video stream and the data timecode included in the data stream.

17. The system of claim 16, wherein the video stream corresponds to video data representing a video game.

18. The system of claim 17, wherein the metadata stream comprises data relating to a position of a player within the video frame.

19. The system of claim 17, wherein the metadata stream comprises data relating to a camera perspective of the video frame.

20. The system of claim 17, wherein the metadata stream comprises data relating to elimination of players from the video game.

* * * * *